United States Patent [19]

Slaugh

[11] 4,258,962
[45] Mar. 31, 1981

[54] CAROUSEL TOOL AND PARTS KIT

[76] Inventor: Mervin J. Slaugh, 1232 N. 3500 West, Vernal, Utah 84078

[21] Appl. No.: 91,238

[22] Filed: Nov. 5, 1979

[51] Int. Cl.³ .................... B62D 53/06; A47B 57/06
[52] U.S. Cl. .................................. 312/125; 280/79.2; 312/135; 312/202; 312/250; 312/252
[58] Field of Search ............... 312/125, 135, 202, 250, 312/252, 284, 306, 313; 280/47, 34, 79.1, 79.2, 81.5

[56] References Cited

U.S. PATENT DOCUMENTS

| | | | |
|---|---|---|---|
| 3,065,037 | 11/1962 | Chapman | 312/312 |
| 3,650,591 | 3/1972 | Longmire, Sr. | 312/306 |
| 3,670,156 | 6/1972 | Schmidt | 312/250 |
| 3,834,724 | 9/1974 | Luoni | 312/125 |
| 4,181,037 | 1/1980 | Boon et al. | 312/125 |

Primary Examiner—Casmir A. Nunberg
Attorney, Agent, or Firm—Lynn G. Foster

[57] ABSTRACT

A carousel tool and parts kit comprising floor engaging erect stand structure including a base supported upon a floor by casters and an elongated slotted centrally erect post having guide slots therein. The carousel tool and parts kit further comprises a tool and parts storage compartment comprising a horizontal disc shaped platform or base, a series of X-shaped vertical walls which rest upon the platform or base and extend vertically upward with each vertical wall forming an equal included angle with the next adjacent wall. Each of the walls are preferably of peg board and support one or more of a variety of fixtures for carrying tools and parts. In addition, a plurality of sliding drawer containers are carried by the platform beneath the lower surface thereof, also for parts and tools. The tool parts and storage compartment is rotatably and rectilinearly displaceably carried concentrically upon the post for manual rotation as desired to provide ready access to the users of parts carried in any of the three mentioned locations. The tool and parts storage compartment may be set at any desired elevation along the length of the post to accommodate needed access to parts and tools independent of whether or not the needed access is near the ground or substantially above the ground. A drive system comprising a cable and a winch/crank mechanism accommodates adjustment in the vertical disposition of the tool and parts storage compartment. A hood is used to cover and conceal the top of the platform and the X-shaped vertical walls when not in use and may be locked by a clamp or latch to prevent unauthorized access.

13 Claims, 4 Drawing Figures

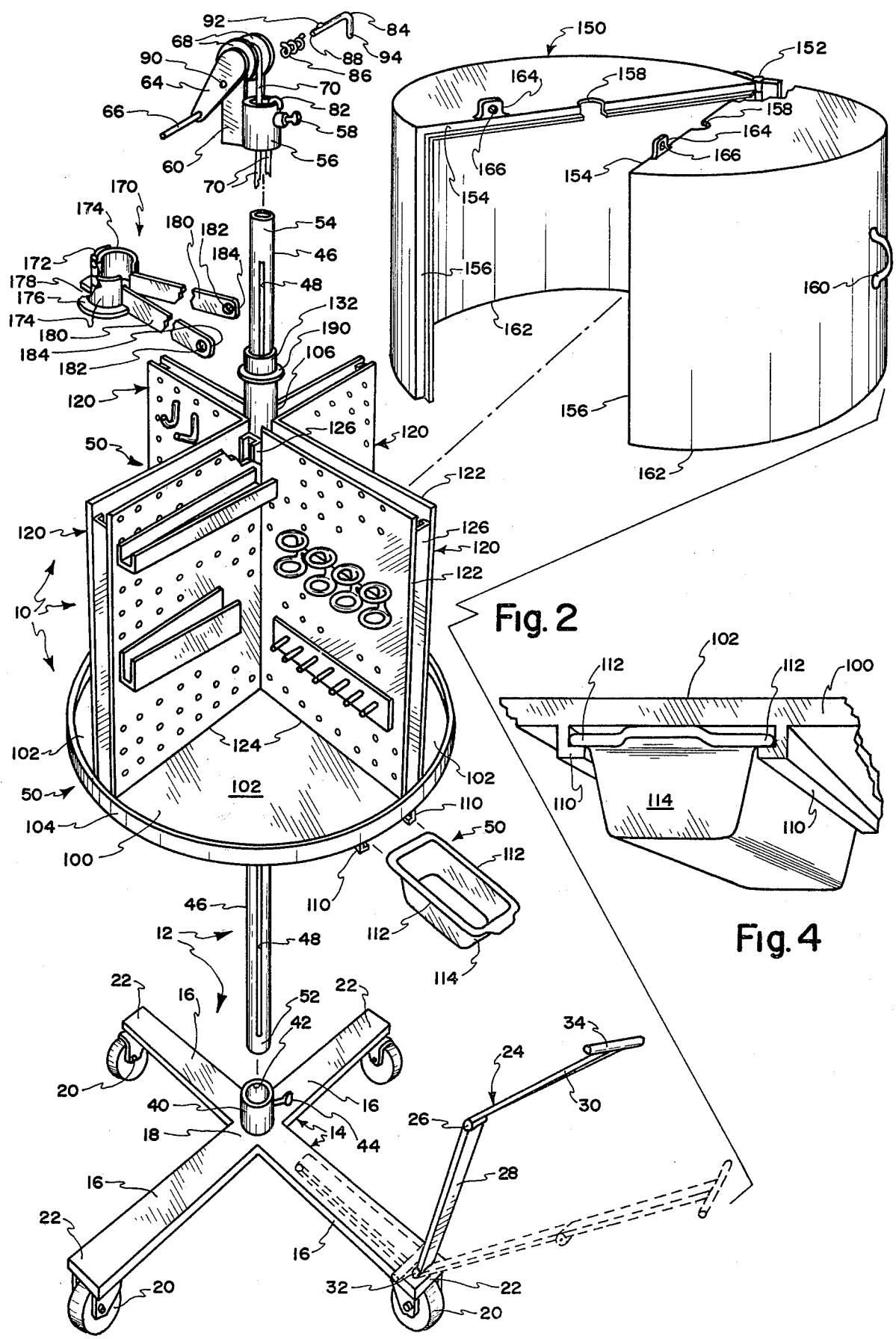

CAROUSEL TOOL AND PARTS KIT

BACKGROUND

1. Field of Invention

The present invention relates generally to tool kits and more specifically to a novel carousel tool and parts kit which may be readily moved from place to place, rotated and vertically adjusted to provide facile access to desired parts and tools and to provide a ready storage site on an interim basis for the parts and tools with which a mechanic is concerned at any point in time.

2. Prior Art

In the past, automobile and like mechanics have carried their tools from place to place in a metal box having a lid and a top handle. Typically, at the repair site, the tool box is opened and the needed tools are removed and placed near by such as upon the ground or on a ledge or the like of the vehicle to be repaired. As tools are used and reused they typically tend to become an array of disorganization spread under, around and on the vehicle. Parts removed during the repair are typically placed here and there are the result of poor organization and lack of capability to otherwise handle the problem.

As a result of the above-described cumbersome procedure, tools and parts are often lost or misplaced, valuable time is lost and efficiency reduced looking for the right tool and the correct part and the mechanic is required to spend much energy and physical effort in the indicated inefficient activities, which have little if anything to do with the actual repair of the vehicle.

BRIEF SUMMARY AND OBJECTS OF THE INVENTION

In brief summary, the present invention overcomes the above-identified tool and parts location, loss and ready access problems and, in its presently preferred form, comprises a kit comprising floor engaging support structure, and a tool and parts storage facility having several sites for receiving tools and parts in hand readily retrievable relation. The tool and parts storage facility is carried at any selected one of several elevations and may be rotated for facile tool and parts access. The storage facility may be closed by a hood equipped with a latch and lock. Casters may be used to wheel the kit from place to place.

Accordingly, it is a primary object of the present invention to provide an improved and novel tool and parts kit making it easy for the mechanic to locate and access to tools and parts needed during repairs and substantially alleviating lost and misplaced tools and parts.

Another important object is the provision of a floor engaging portable tool and parts kit.

A further significant object is the provision of a novel kit comprising a tool and parts storage facility having several sites for receiving tools and parts in hand readily retrievable relation.

A further dominant object of the present invention is the provision of a tool and parts kit comprising a storage facility carried at any one of several selected elevations for handy access by the mechanic.

A further object is the provision of a novel tool and parts kit having a storage facility which may be selectively rotated for facile tool and parts access.

A further paramount object of the present invention is the provision of a novel tool and parts kit having a storage facility which may be closed by a hood, latched and locked to prevent unauthorized access.

These and other objects and features of the present invention will be apparent from the detailed description taken with reference to the accompanying drawings.

BRIEF DESCRIPTION OF THE DRAWINGS

FIG. 2 is an exploded perspective of the tool and parts kit of FIG. 1;

FIG. 4 is a perspective representation of one of the drawers carried at the tool and parts storage site of the kit of FIG. 1.

DETAILED DESCRIPTION OF THE ILLUSTRATED EMBODIMENT

Figures 1, 3:
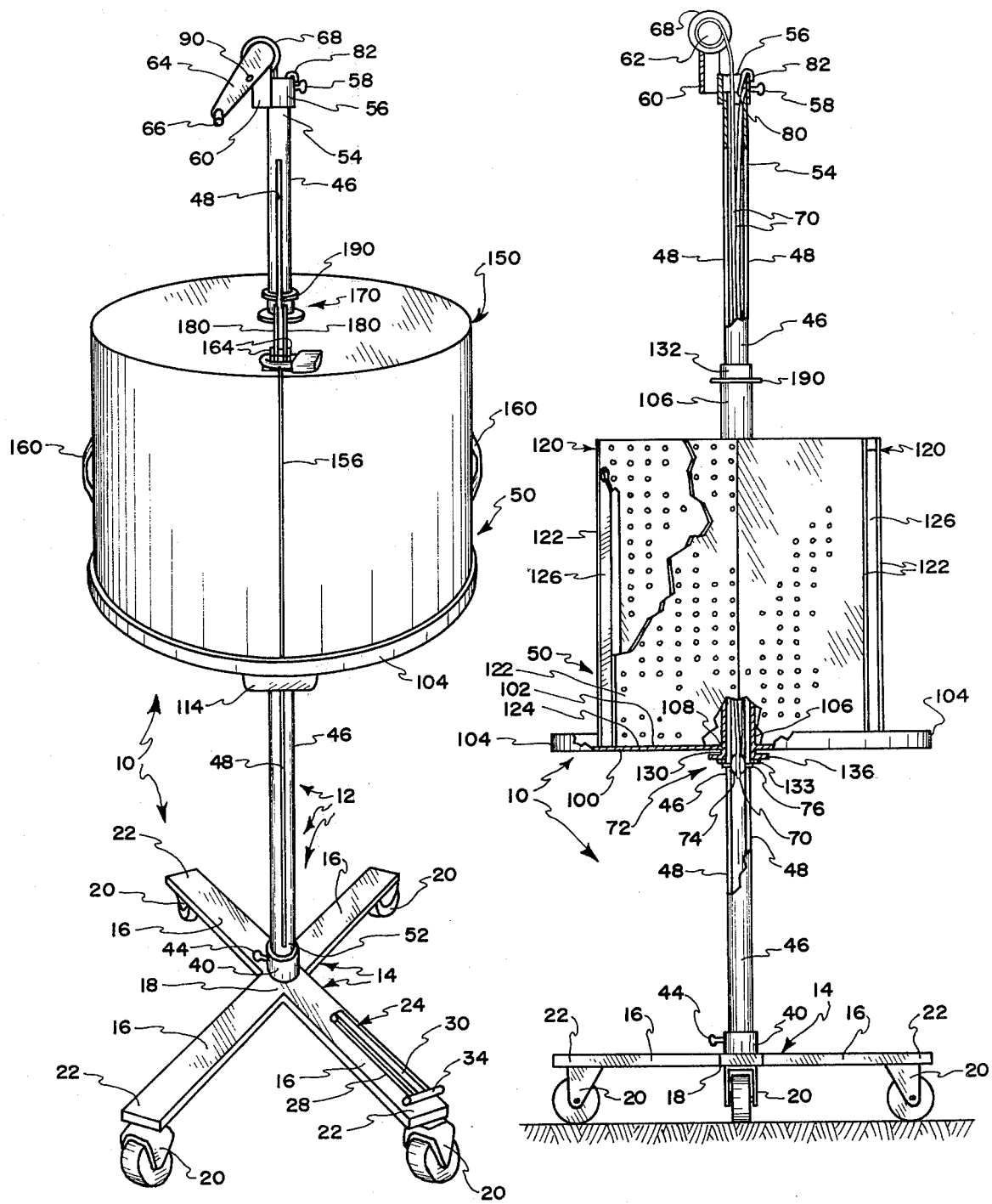
FIG. 1 is a perspective representation of a presently preferred tool and parts kit, fashioned in accordance with the present invention.
FIG. 3 is an elevation view of the tool and parts kit of FIG. 1 with the hood and drawers removed and certain parts broken away for clarity of illustration.

Reference is now made to the drawings wherein like numerals are used to designate like parts throughout and which illustrate a presently preferred tool and parts kit generally designated 10, according to the present invention. Kit 10 comprises floor engaging support structure, generally designated 12, which comprises an X-shaped support base, generally designated 14, comprising rigid legs 16, preferably formed of rigid structural steel. Legs 16 are illustrated as being at 90 degree intervals and intersect symmetrically at a common central location 18. Each leg 16 carries a conventional caster 20 adjacent the distal end 22 thereof.

Thus, the support base 14 and the structure carried by the support base 14 may be wheeled across a floor or the like from place to place. This may be done by utilizing a fan-fold tongue, generally designated 24.

Fan-fold tongue 24 comprises a central fulcrum or hinge 26 about which proximal and distal legs 28 and 30 relatively pivot. Leg 28 is hinge connected at 32 to the distal end 22 of one of the support base legs 16 for relative movement, as shown in the two dotted positions and the one solid position of FIG. 2. A handle 34 is integrally secured as by welding to the distal end of the leg 30. Handle 34 is intended to be grasped by the user to facilitate rolling the kit 10 from place to place on the floor or ground, as desired. When not in use tongue 24 is folded over itself and against the top of the associated leg 16, as illustrated in FIG. 1.

The central site 18 of the support base 14 carries a vertically extending collar 40 having a hollow circular interior 42. A set screw 44 is secured for rotational displacement in a threaded bore disposed at one side of the collar 40. The collar 40 is welded or otherwise suitably integrally connected at its lower end to support site 18 so as to be at the axial center of the kit 10.

The erect stand structure 12 further comprises an elongated slotted central erect post or column 46 of hollow tubular material, such as steel pipe. Post 46 comprises a pair of opposed, parallel equally sized slots 48 which extend substantially the entire length of the post 46 and function as vertical guides to accommodate support of and vertical displacement of a tool and parts storage compartment, generally designated 50, as hereinafter more fully described.

The outside diameter of the post 46 is slightly less than the inside diameter of the collar 40. The support base 14 and the post 46 are caused to be rigidly secured one to the other when assembled by placement of the proximal end 52 of the post 46 in the hollow 42 of the collar 40, after which the set screw 44 is firmly turned into locked engagement with the exterior surface of the distal end 52 of the post 46. The mentioned assembled position is illustrated in FIGS. 1 and 3 of the drawings.

The erect stand structure 12 may be readily disassembled for transportation or storage purposes by loosening the set screw 44 and by lifting the column or post 46 out of the collar 40, as illustrated in FIG. 2.

The length of post 46 may be as desired. Something on the order of six feet is ordinarily adequate for the work conducted by most mechanics. The post 46 rotatably passes loosely through the hollow interior of the tool and parts storage compartment 50, as hereinafter more fully explained to accommodate rotation of the compartment 50.

The top distal end 54 of the hollow tubular post 46 is equipped with a removable annular collar 56, secured in the assembled position by tightening of a set screw 58. Set screw 58 is held in a threaded bore of the collar 56 and which, when tightened, firmly though releasably connects the collar 56 to the distal end 54 of the column 46.

The collar 56 eccentrically and integrally supports an upwardly directed U-shaped bracket 60, as by welding or the like. The stationary U-shaped bracket 60 rotatably journals a short shaft 62 (FIG. 3). Rotatable shaft 62 is integrally connected at one end, as by welding, to an eccentric crank 64 having a handle 66. By appropriately grasping the handle 66 and rotating the crank 64 in one direction or the other, the user is able to adjust the elevation of the tool and parts compartment 50, as mre fully explained.

Centrally and integrally attached to the shaft 62 is a spool or winch 68 on which cable 70 is taken up and from which cable 70 is dispensed. The cable 70 runs downwardly into and along the hollow interior of the post 46 to a site 72 immediately below the tool and parts storage compartment 50.

Site 72 is a mobile site and comprises a pulley 74 around which the cable 70 traverses substantially 360 degrees. Pulley 74 comprises a central shaft 76 which accommodates rotation of the pulley 74. The opposed ends of the shaft 76 extend through and are slidably, though guidedly received in opposed slots 48 of the post 46. Thus, vertical movement of the pulley 74 with the compartment 50 is such that the shaft 76 remains in the same vertical plane during such displacement.

The distal end 80 of the cable 70 comprises a hook 82 which is integrally secured as by welding to the cable end and which is placed over the top edge of the collar 56, as best illustrated in FIG. 3, to statically secure by gravity the cable distal end 80 against axial displacement in respect to the post 46. However, the cable may be readily removed from the interior of the post 46, for long distance transportation and/or storage by merely lifting the hook 82 from engagement with the collar 56 and pulling the cable 70 (from a site adjacent the winch 68) to remove the cable from around the pulley 74 and from within the interior of the post 46.

A stop mechanism is provided in connection with the crank 64 for securely retaining the elevation of the compartment 50 at any desired setting. More specifically, L-shaped pin 84 (FIG. 2) passes loosely through aligned apertures in the two vertical legs of the U-shaped bracket 60 and is spring bias by a concentric spring 86 toward the crank 64. The mentioned bias causes the distal end 88 of the pin 84 to normally project through an aperture 90 in the crank 64 to thereby prevent clockwise and counterclockwise rotation of the crank. This secures the compartment 50 at a desired elevation.

The spring 86 is interposed in abuting relation between the right leg of the U-shaped bracket 60 (as viewed in FIG. 2) and a stop protrusion 92 on the pin 84. Thus, the distal end 88 of the pin 84 is normally caused to be positioned in aperture 90. However, by grasping the end 94 and pulling the pin 84 away from the crank 64 against the bias of spring 86, the distal end 88 of the pin 84 is removed from the aperture 90 to accommodate clockwise and/or counterclockwise rotation of the crank 64.

The tool and parts storage compartment 50 comprises a horizontally disposed disc shaped planar base or platform 100 which is divided into 90 degree quadrants 102, each of which, at the upper surface of the platform 100, comprises a storage area upon which tools and parts may be placed as desired by the mechanic to avoid loss and misplacement and to accommodate easy location and facile retrieval of such stored tools and parts. The precise arrangement for such storage may be customized by the user in accordance with his desires. The platform 100 comprises an integral exterior annular flange 104. The flange 104 and platform 100 are preferably fabricated of steel and are welded one to the other.

The compartment 50 also comprises a hollow metal sleeve 106 which is coaxial and coextensive with the height of the compartment 50 while loosely and concentrically surrounding the post 46. The center of the platform 100 is hollow at site 108 and is there integrally welded to the exterior of the sleeve 106. Thus, the sleeve 106 and the platform 100 move up and down and rotate about the post 46 integrally.

A plurality of drawer guides 110 are disposed in parallel spaced L-shaped pairs integral with the bottom surface of the platform 100. Each pair of guides 110 receive in guiding relation lips 112 of a drawer 114. Drawer 114 is illustrated as being in the nature of a tote pan. Although only one such drawer 114 is illustrated, it is to be appreciated that the present invention contemplates use of a plurality of such tool and parts storage facilities. By rotating the platform 110, the mechanic is able to dispose any desired drawer 114 in an appropriate orientation within handy reach so that the parts or tools contained therein are available for ready access.

The storage compartment 50 further comprises four vertically extending wall segments, generally designated 120, which, when taken together, form an X-shaped wall structure and divide the upper surface of the platform 100 into the quadrants 102. As illustrated, each wall segment 120 comprises two spaced exposed parallel particle board walls 122, each having a radial width slightly less than the radius of the platform 100. The bottom edge 124 of each rectangularly shaped wall 122 of particle board rests upon the upper surface of the platform 100 in load transferring relation. The height of each particle board section 122 may be of any desired dimension. For most purposes, two to three feet is sufficient.

The interior of each wall section 120 comprises a pair of steel channel members 126. Each channel 126 is flange contiguous with the back sides of the two parallel spaced particle board walls 122 and is secured in such relation by bonding, screws, bolts or the like, as desired.

The interior one of the channel spacers 126 associated with any two parallel walls 122 is also integrally secured at its vertically directed base to the central sleeve 106, as by welding. This in turn integrally secures each entire wall segment 120 rigidly in the vertically upright position best illustrated in FIG. 2. Thus, the four wall segments 120 are held contiguous with and, therefore, move up and down and rotate with the platform 100 and the sleeve 106. The mentioned rotation is principally accommodated by bushings at sites 130 and 132, disposed at the lower and upper ends, respectively, of the sleeve 106.

It is to be appreciated that the wall segments 120 are not necessarily to be formed of particle board, although particle board accommodates utilization of a plurality of fixtures which readily receive tools, parts and the like. Of course, each mechanic may customize the wall segments 120 to suit his own preferences for part and tool storage and retrieval.

As best illustrated in FIG. 3, a washer 134 is interposed between the lower flange 136 of the sleeve 106 and the pulley shaft 76. The weight of the tool and parts storage compartment is transferred to the platform 100 and thence to the central sleeve 106. This load is in turn transferred to the washer 133 and the pulley shaft 76 and ultimately to the cable 70. Thus, when the crank 64 is appropriately rotated, with the lock mechanism comprising pin 84 retracted, the elevation of the compartment 50 may be readily moved up or down as desired. If the mechanic is working beneath a vehicle, the compartment 50 is usually placed at an elevation directly above the support base 14 for ready access to parts and tools and for storage and retrieval of such. On the other hand, if the mechanic is working from an elevated position, say above the engine of a vehicle, the compartment 50 may be cranked into an elevated location directly juxtaposed to the work site of the mechanic for use as indicated. At any site, rotation of the compartment 50 about the post 46 accommodates facile placement of tools and parts for storage and retrieval of the same.

The storage compartment 50 comprises a clam shell hood, generally designated 150. Hood 50 comprises two halves vertically hinged at site 152 along one side. A parting line, within the plane of the hinge 150 is provided across the top at 154 and along the opposed side 156. Sides 154 and 156 are illustrated as being stepped along one of the two hood halves to accommodate contiguous closure and prevent subsequent forced entry by unauthorized personnel. Preferably, the hood 150 is fabricated from thin gauge sheet metal. The top of the two hood sections comprise semi-circular opening 158 which come together to form a circular opening the diameter of which is larger than the post 46 which extends therethrough. The halves of the hood 150 are provided with integral handles 160 to accommodate manual placement and removal over the wall segments 120 upon the platform 100, as illustrated in FIG. 1. The height of the hood 150 is slightly in excess of the height of the wall portions 120. In addition, the lower edge 162 of the hood 150 is of a diameter so that when closed said lower edge 162 will fit within the flange 104 but outside the exposed vertical edges of the wall segments 120.

The halves of the hood 150 comprise opposed aligned ears 164 presenting aligned apertures 166. A clamp or lock, generally designated 170 is provided for securing the hood 150 in closed, locked condition to obviate access thereto by unauthorized persons.

Clamp 170 comprises a central hinge 172 pivotally securing opposed halves of the clamp 170 one to the other. Each half of the clamp 170 comprises a hollow semi-cylindrical vertical wall 174 each traversing 180 arcuate degrees and an integral horizontal flange 176 traversing less than 180 degrees leaving a pivot accommodating gap 178. Integral arms 180 project radially outwardly and are integrally connected to the distal edges of the hollow semi-cylindrical walls 174.

Each arm 180 is disposed in a vertical plane and comprises an opening 182 at the distal end 184 thereof. The length of the arms 180 and the location of the apertures 182 are selected so that the apertures 182 align one with the other as well as with the apertures 166 of the hood ears 164. Thus, by placing the horizontal flanges 167 upon the top of the hood with the semi-cylindrical walls 174 closed and projecting upwardly, the arms 180 will extend along the exterior of the hood 180 between the ears 164.

A lock is placed through all four apertures 166 and 182. Thus, the clam shell halves of the hood 150 may not be opened. The arcuate vertical walls 174 of the clamp 170 extend into close proximity to an annular flange 190 adjacent the bearing site 132 of the sleeve 106. Thus, neither the locked clamp nor the hood may be lifted.

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tool and parts kit for on site use by a mechanic comprising:
   elongated generally vertically extending stand means;
   tool and parts storage compartment means, at least a portion of which concentrically surrounding a portion of the elongated stand means, the compartment means comprising a disc-shaped base plate and a plurality of angularly related substantially vertically directed walls, the lower edge of the walls being essentially in a plane containing the upper surface of the base plate and the base plate and the walls each providing a plurality of tool-receiving sites;
   means by which the elevation of the entire compartment means may be vertically adjusted along the erect elongated stand means to any one of an infinite number of positions;
   means by which the entire compartment means are caused to be rotated about the elongated stand means to any desired one of an infinite number of radial positions.

2. A tool and parts kit for on site use by a mechanic comprising:
   floor engaging means;
   central stand means;
   tool and parts storage means centrally supported upon the stand means above the floor by the floor engaging means;
   the tool and storage means comprising a base plate means and a plurality of angularly related wall means each extending inwardly and upwardly directly above the base plate means, the base plate means and each wall means respectively providing a plurality of tool-receiving sites;

means by which the entire storage means are caused to be rotated from time to time about the stand means to any one of an infinite number of radial tool access positions;

means by which the elevation of the entire storage means are caused to be varied from time to time to any one of an infinite number of tool access positions.

3. A tool and parts kit according to claim 2 wherein the floor engaging means comprise a caster supported base and the central stand means comprise a vertically erect elongated post passing centrally through the storage means.

4. A tool and parts kit according to claim 3 further comprising a connector interposed between and releasably joining the base to the post.

5. A tool and parts kit according to claim 4 further comprising a tongue connected to the base for manually pulling the kit across the floor upon the casters.

6. A tool and parts kit according to claim 2 wherein the storage means further comprises sliding drawer means situated beneath the base plate means.

7. A tool and parts kit comprising:
floor engaging means;
tool and parts storage means supported above the floor by the floor engaging, the storage means comprising carousel means centrally surrounding, linearly displaceable along and rotatable around a support post, the carousel means comprising a plurality of tool and part storage sites, said sites comprising horizontal platform means, vertical wall fastening means and drawer means, the horizontal platform means comprising a disc shaped platform comprising the base of the carousel means, the vertical wall fastening means comprising four X-shaped walls resting upon and extending vertically above the platform and the drawer means comprising a plurality of drawers slidably carried by guide structure beneath the platform;
means by which the storage means are caused to be rotated from time to time;
means by which the elevation of the storage means is caused to be varied from time to time.

8. A tool and parts kit according to claim 2 further comprising a removable hinged clam shell type hood which entirely covers the tool and parts storage means and completely conceals all tool-receiving sites when not in use.

9. A tool and parts kit according to claim 8 further comprising latch means by which the hood is locked closed during non-use to prevent unauthorized access.

10. A tool and parts kit according to claim 2 wherein the rotation causing means comprise bearing means interposed between the storage means and the stand means.

11. A tool and parts kit according to claim 2 wherein the elevation varying means comprise drive means interposed between the floor engaging means and the storage means by which the storage means are caused to be lifted and lowered.

12. A tool and parts kit comprising:
floor engaging means;
tool and parts storage means supported above the floor by the floor engaging means;
means by which the storage means are caused to be rotated from time to time;
means by which the elevation of the storage means is caused to be varied from time to time;
the elevation varying means comprising drive means interposed between the floor engaging means and the storage means by which the storage means are caused to be lifted and lowered;
the floor engaging means comprising an erect post and the storage means concentrically surround part of the post, the drive means comprising a cable displaceably interposed between the post and the storage means and crank means for taking up and letting out cable.

13. A tool and parts kit according to claim 12 wherein the post is hollow and oppositely slotted to provide guide surfaces and the cable is attached at one end to the top of the post, passes centrally down into the hollow of the post, around a movable pulley and upwardly out of the hollow of the post to the crank means, which crank means are mounted to the post adjacent the top thereof, the movable pulley comprising shaft means passing through and being guided during displacement by the opposite slots in the post, the shaft means supporting the storage means at each selected elevation.

* * * * *